(12) United States Patent
Lytle (10) Patent No.: US 7,510,369 B2
(45) Date of Patent: Mar. 31, 2009

(54) SACRIFICIAL INNER SHROUD LINERS FOR GAS TURBINE ENGINES

(75) Inventor: William C Lytle, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 580 days.

(21) Appl. No.: 11/219,177

(22) Filed: Sep. 2, 2005

(65) Prior Publication Data

US 2007/0237631 A1 Oct. 11, 2007

(51) Int. Cl.
*F01D 9/00* (2006.01)
(52) U.S. Cl. .................... 415/160; 415/191; 415/209.3; 29/889.22
(58) Field of Classification Search ................ 415/160, 415/191, 209.3; 29/889.22
See application file for complete search history.

(56) References Cited

U.S. PATENT DOCUMENTS

| 4,706,354 A | * | 11/1987 | Naudet et al. ............ 29/889.22 |
| 6,086,327 A | * | 7/2000 | Mack et al. ................. 415/160 |
| 6,790,000 B2 | * | 9/2004 | Wolf .......................... 415/165 |

* cited by examiner

*Primary Examiner*—Igor Kershteyn
(74) *Attorney, Agent, or Firm*—Kinney & Lange, P.A.

(57) ABSTRACT

A split shroud system for a gas turbine engine having a pair of annular-shaped shrouds that each have an inner pocket; to form a pair of inner pockets. Each of the pair of pockets having liner parts that form a circle. Liner parts of one of the pair of pockets facing liner parts of the other of the pair of pockets to form liner part pairs. One of each of said of pair of liner parts has a mutual abutting surface that forms a plurality of slots for accepting a plurality of vane inner trunnions.

19 Claims, 7 Drawing Sheets

SACRIFICIAL INNER SHROUD LINERS FOR GAS TURBINE ENGINES

STATEMENT REGARDING FEDERALLY SPONSORED RESEARCH OR DEVELOPMENT

This invention was made with Government support under F33615-99-D-2051-0010 awarded by the United States Air Force. The Government has certain rights in this invention.

BACKGROUND OF THE INVENTION

1. Field of the Invention

The present invention relates to a shroud for a gas turbine engine. More particularly, the present invention relates to an inner liner for a shroud for a gas turbine engine. Still more particularly, the present invention relates to an inner graphitic carbon liner that is received in a shroud of a gas turbine engine to reduce the overall engine weight and cost and vane trunnion wear.

2. Description of Prior Art

The operating environment for a turbofan engine and its various component is extremely harsh. The vibrations due to normal use at operating speeds are extreme. The operating temperature of some of the components are also extremely high. One of the many components that may experience wear in the engine due to vibrations and high temperature are the variable vanes' inner trunnions.

Currently, the trunnions are encased within a carbon steel split bushing. The split bushing is secured between a carbon steel split inner shroud. During wear, the carbon steel bushing and carbon steel split liner vibrate against one another and cause considerable wear on the vane's inner diameter trunnion encased in the bushing. The wear on the trunnion reduces the lifecycle of the trunnion and increases maintenance time and expense due to required replacement/refurbishment of the entire vane.

Therefore there exists a need for a shroud that can receive a sacrificial graphitic carbon liner to hold a vane trunnion, thereby reducing trunnion replacement/refurbishment costs, overall engine weight and cost of ownership and maintenance.

SUMMARY OF THE INVENTION

It is an object of the present invention to provide an engine shroud having a reduced weight.

It is also an object of the present invention to provide a split engine shroud that is manufactured from titanium.

It is another object of the present invention to provide an engine shroud that is manufactured to accommodate a graphitic material wear surface.

It is still another object of the present invention to provide titanium shroud that accommodates an inner graphitic liner.

It is still yet another object of the present invention to provide a titanium shroud that eliminates the need for a split carbon steel bushing around a vane trunnion.

It is a further object of the present invention to reduce the maintenance cost associated with vane trunnion repair.

It is still a further object of the present invention to provide a vane trunnion that does not need a hard coat for its wear surface.

It is still yet a further object of the present invention to provide an engine shroud that has a wear surface that is operational at elevated temperatures.

It is yet a still further object of the present invention to provide a graphitic liner that can easily be reused or replaced.

It is still yet another object of the present invention to provide an engine shroud that increases vane life.

These and other objects and advantages of the present invention are achieved by the present invention that provides a split engine shroud system having a pair of annular-shaped shrouds that each contain an inner pocket to form a pair of facing pockets. The invention also provides for a pair of liners contained within one of the pair of pockets and the other of the pair of liners contained in the other pocket. Each pair of liners have a mutually contacting surface that forms a plurality of slots.

A split engine shroud system having a pair of annular-shaped shrouds that each have an inner pocket; to form a pair of inner pockets. Each of the pair of pockets having liner segments that firm a circle. Liner segments of one of the pair of pockets facing liner segments of the other of the pair of pockets to form liner segment pairs. One of each of said of pair of liner segments has a mutual abutting surface that forms a plurality of slots. The liner parts and the plurality of slots accept wear caused by the trunnions during operation flight conditions of the engine.

DETAILED DESCRIPTION OF THE INVENTION

Figure 1:
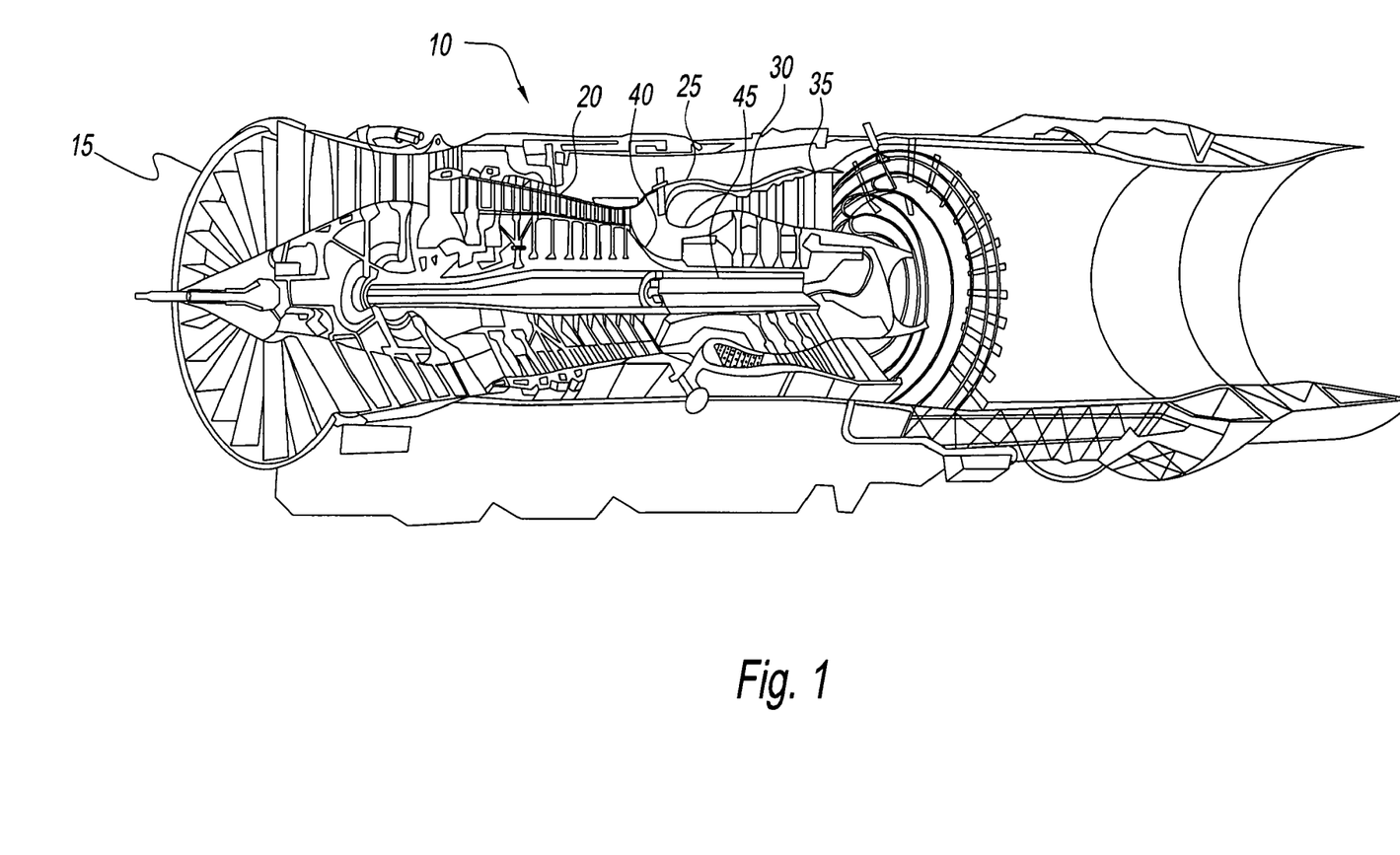
FIG. 1 is a partial cut-away cross-sectional view of a turbofan engine of the present invention.

Referring to the drawings, and in particular to FIG. 1. An axial flow gas turbine engine 10 used for powering an aircraft in flight or powering an electrical generator, is shown. Engine 10 typically includes, in serial flow communication, a fan module 15, a high pressure compressor 20, a combustor 25, a high pressure turbine 30, and a low pressure turbine 35. Combustor 25 generates combustion gases that are channeled in succession to high pressure turbine 30 where they are expanded to drive the high pressure turbine 30, and then to the low pressure turbine 35 where they are further expanded to drive the low pressure turbine 35. High pressure turbine 30 is drivingly connected to the high pressure compressor 20 via a first rotor shaft 40, and low pressure turbine 35 is drivingly connected to the fan module 15 via a second rotor shaft 45.

Figure 2:
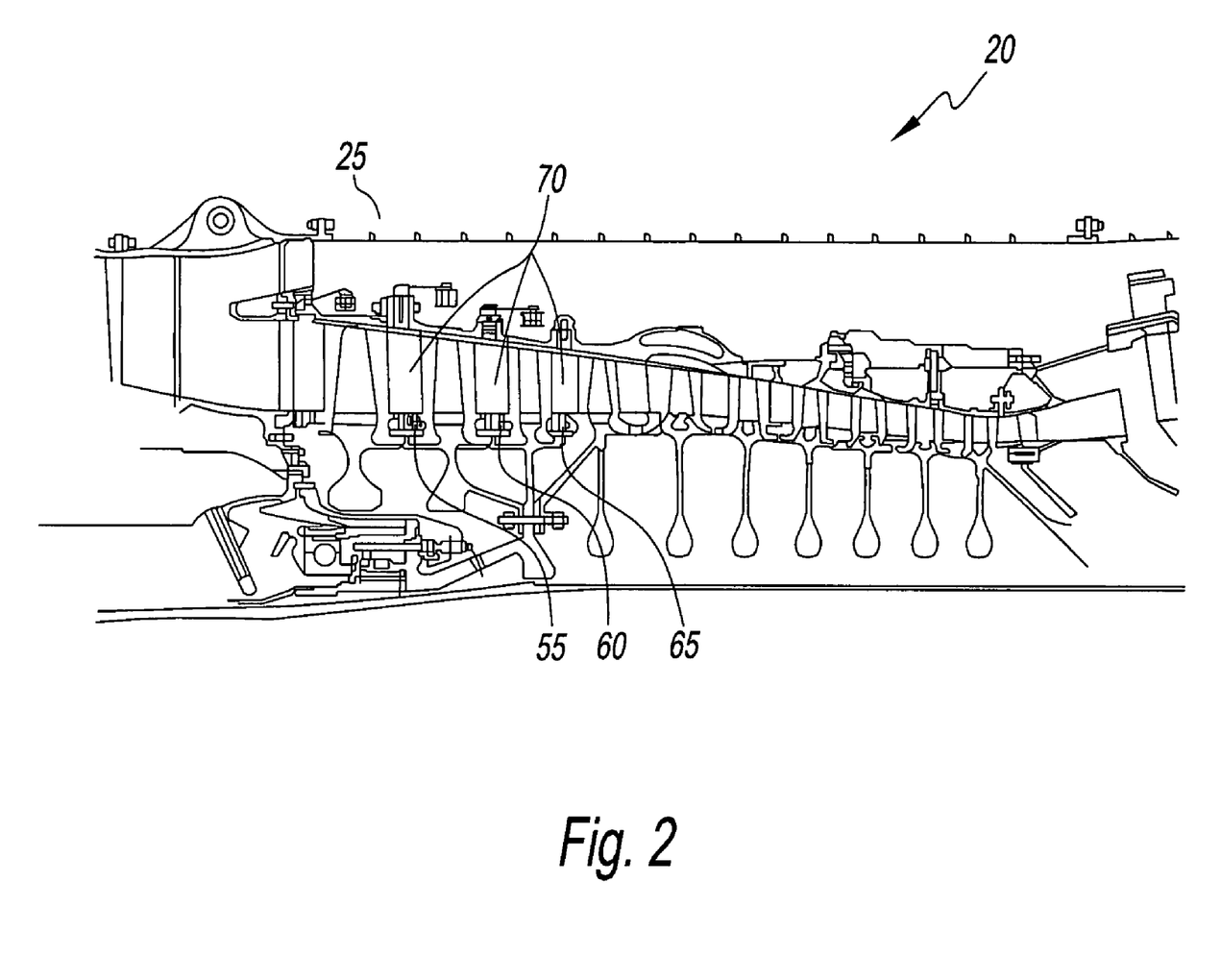
FIG. 2 is a partial cross-sectional view of the shrouds and vanes of the turbofan engine of FIG. 1, specifically showing the $4^{th}$, $5^{th}$ and $6^{th}$ stages of the present invention.
Figure 3:
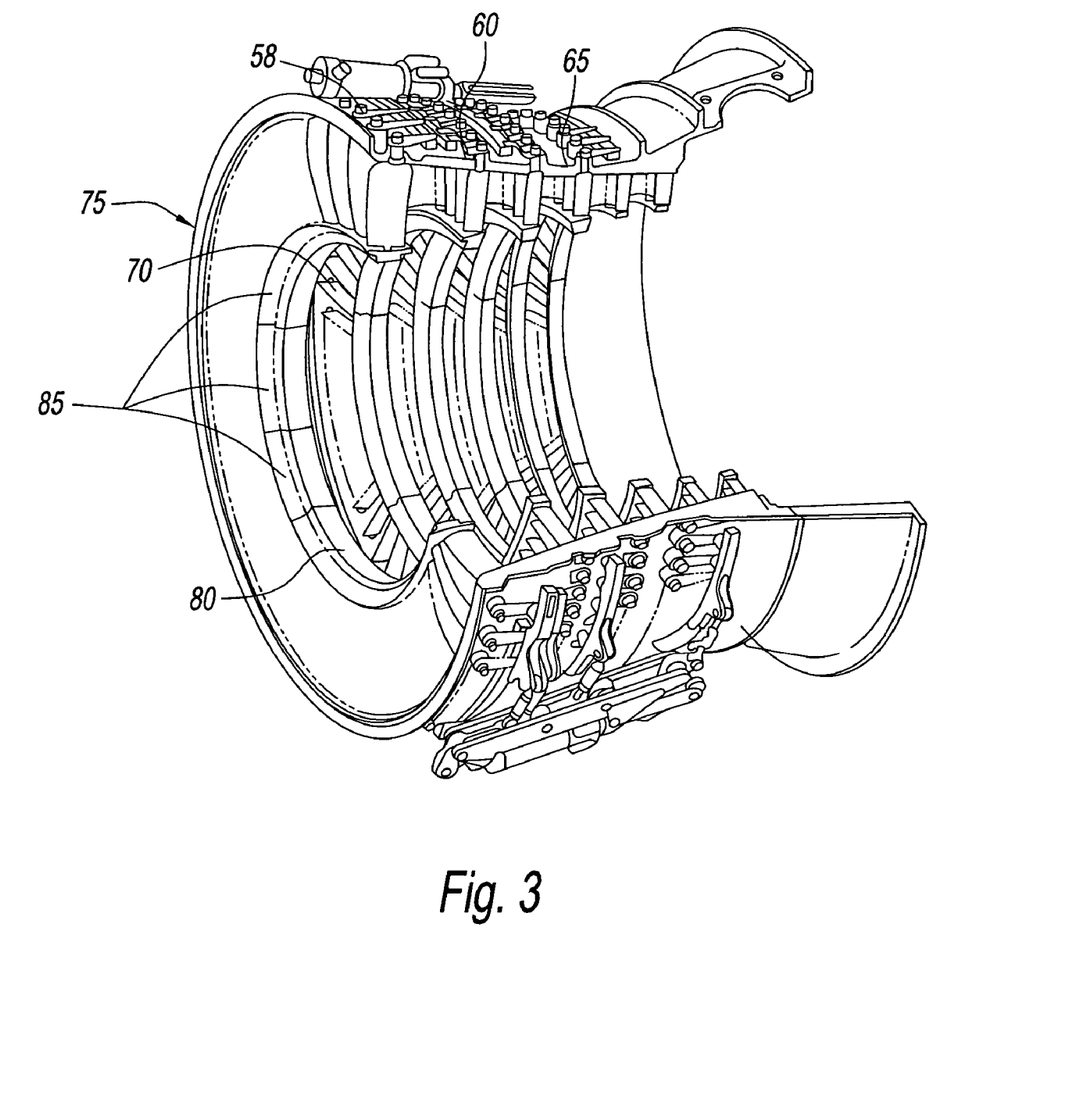
FIG. 3 is a partial cut-away perspective view of the turbofan engine showing the shrouds and vanes of the engine of FIG. 1.

Referring to FIGS. 2 and 3, high pressure compressor 20 typically includes a series of variable 55, 60 and 65 and fixed stator vane stages used to direct the gas flow during compression for engine 10 and aircraft use. The annular dimension of each of stages 55, 60 and 65 becomes increasingly smaller to compress the air for use in following engine stages. Compressor stage 55 or the $4^{th}$ stage is formed of a plurality of circumferentially arranged cantilevered inlet guide vanes 70. Each of the stages of the compressor 20 includes a set of circumferentially arranged vanes 70 captured between a compressor case 75 of the compressor 20 and a vane shroud 80. The shroud 80 provides an aerodynamic flowpath boundary of the high pressure compressor 20. Shroud 80 comprises a plurality of shroud segments 85 that extend completely around the inner circumference of compressor 20 to retain all vanes 70 of stages 55, 60 and 65.

Figure 4:
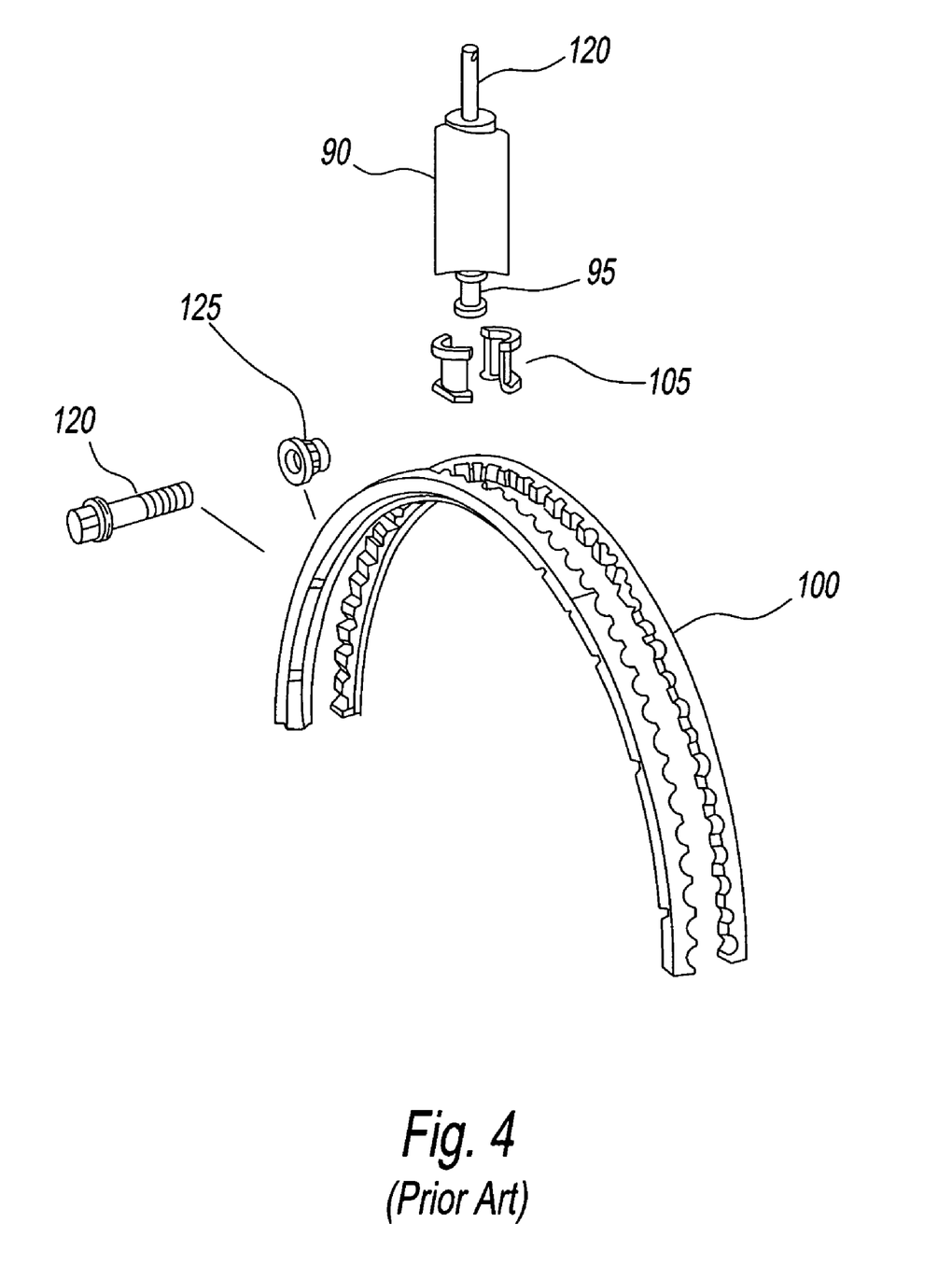
FIG. 4 is an exploded perspective view of a shroud, vane and bushing configuration of the prior art.

Referring to the prior art of FIG. 4, a vane 90 includes an inner trunnion 95 at its end closest to the interior of the engine. Inner trunnion 95 is made from a very hard material such as tempered steel and typically has a hard coating applied. Inner trunnion 95 is used to retain vane 90 in an inner vane shroud 100, while allowing the vane 90 to rotate about the trunnion 95. Inner vane shroud 100 has two identical portions that are each made from a material such as carbon steel. A split bushing 105 encases inner trunnion 95 before it is placed in and held by inner vane shroud 100. Split bushing 105 is made from a material such as a carbon steel. Similarly, an outer bushing (not shown) is used to retain vane in compressor case 75. A bolt 120 and nut 125 secure the portions of shroud 100 in the axial direction.

During operation of the engine 10, constant aerodynamic pressure forces associated with the operation of the high pressure compressor 20 load the inner shroud toward the stator case. Further, the vibrations between the bushing 105 and the inner trunnion 95 generate extreme stresses and friction. High temperatures can be generated between mutual surfaces of contacting components and cause wear and oxidation.

Figure 5:
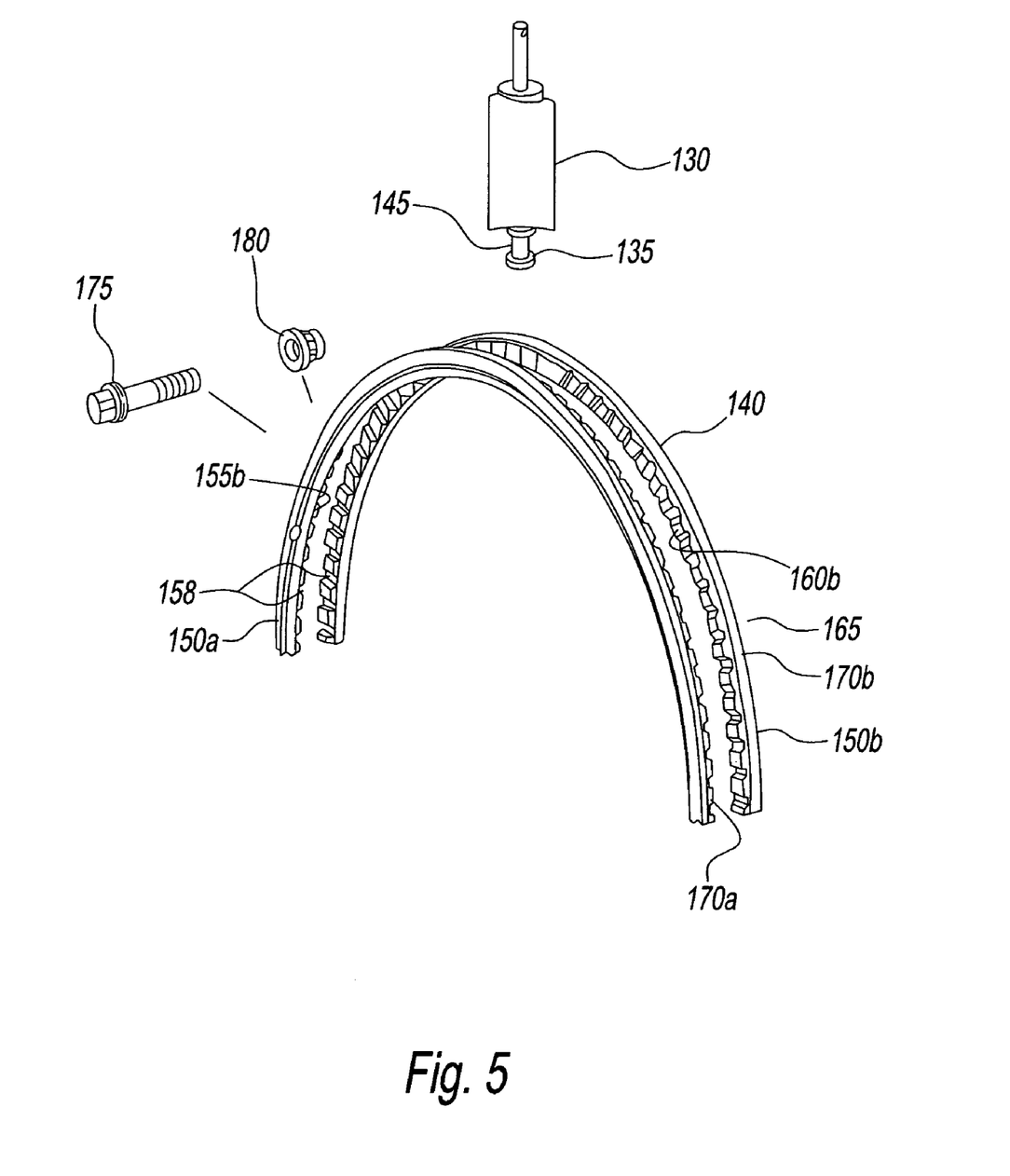
FIG. 5 is an exploded perspective view of the shroud, graphitic liner and vane of the present invention.
Figure 6:
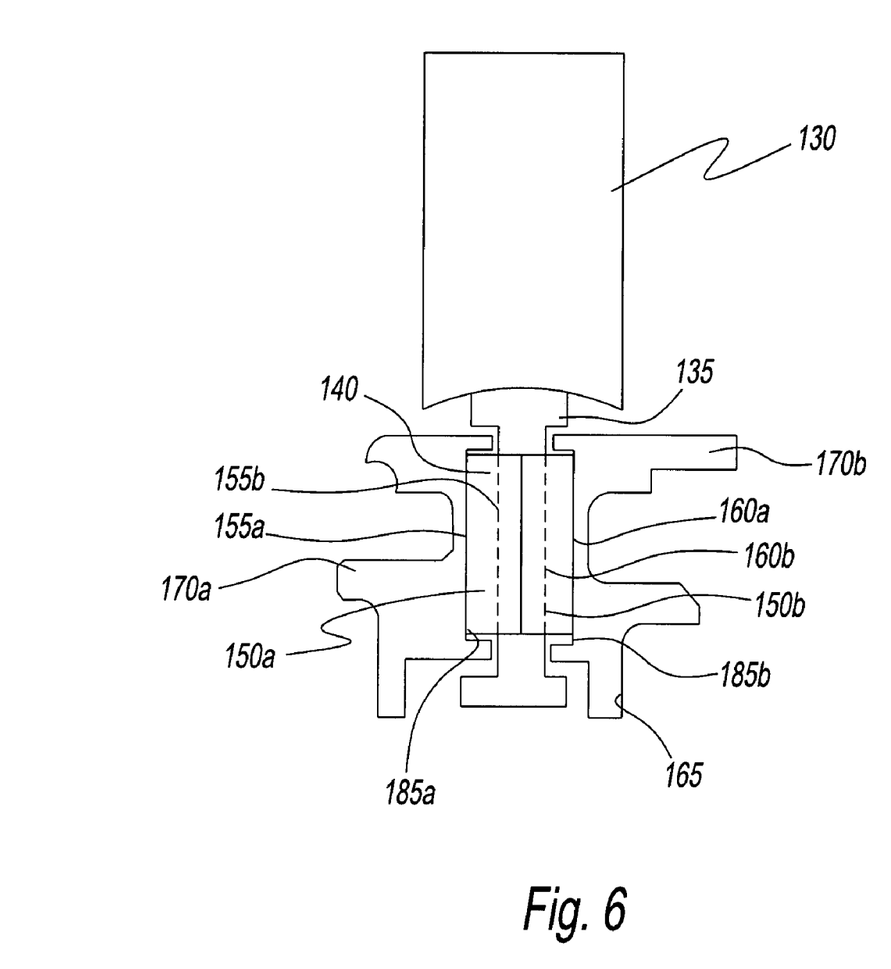
FIG. 6 is a cross-sectional view of the shroud with a graphitic liner of the present invention.
Figure 7:
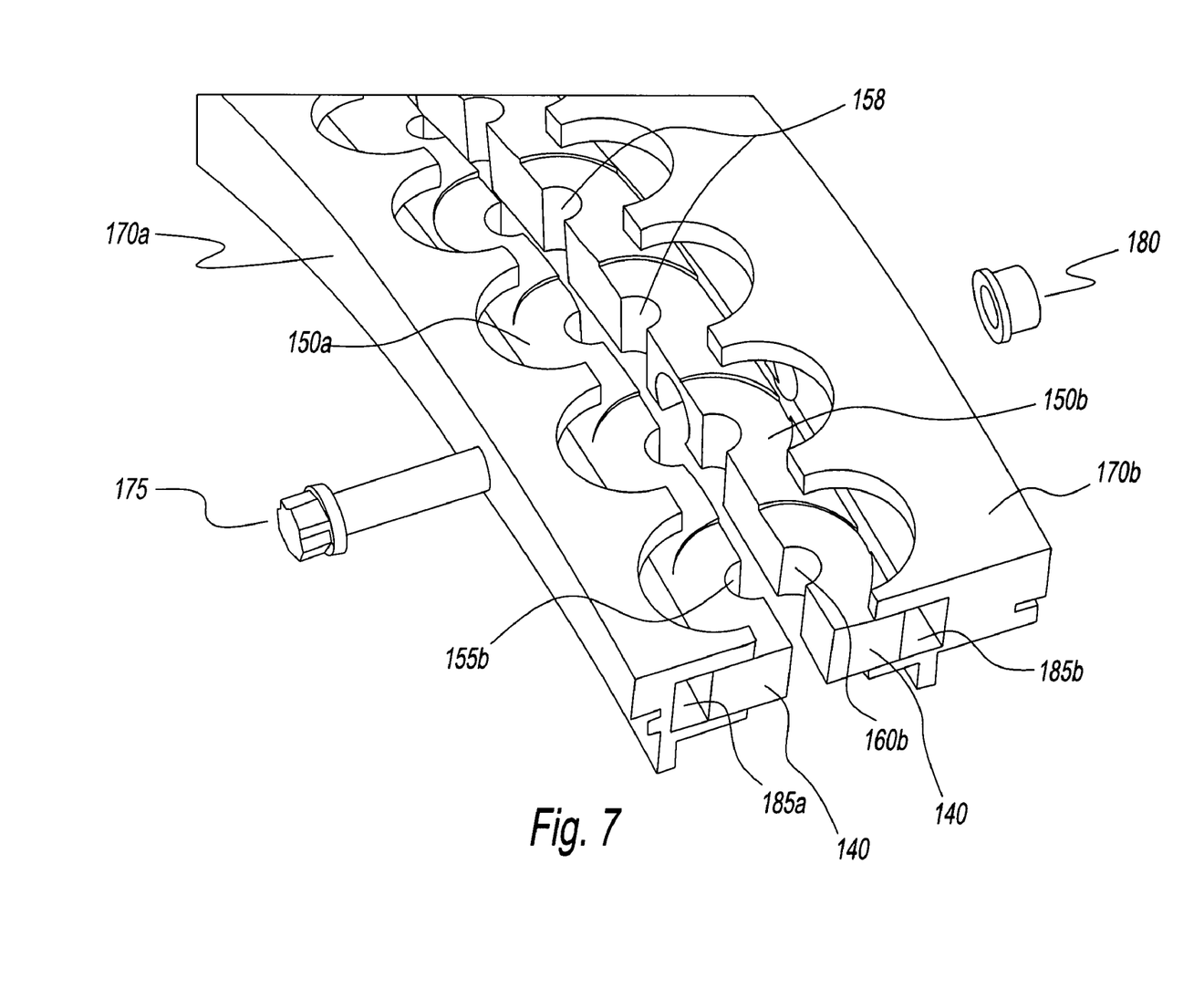
FIG. 7 is a partial perspective view of the shroud with the graphitic liner of the present invention.

Referring to FIGS. 5 through 7, of the current invention, a vane 130 has an inner trunnion 135 that is enclosed in a split shroud or a liner 140 without any bushing. The trunnion 135 is preferably made from a strong lightweight material such as titanium. Trunnion 135 has an outer bearing surface 145. Liner 140 is preferably made from a material such as graphitic carbon and has two identical components having a plurality of parts 150a and 150b. Parts 150a have opposing surfaces 155a and 155b and parts 150b have opposing surfaces 160a and 160b. Surfaces 155b and 160b form a plurality of slots 158 after parts 150a and 150b are fully assembled. Shroud 165 has numerous components including two portions 170a and 170b. Shroud portions 170a receive liner parts 150a and shroud portions 170b receive liner segments 150b. Shroud portions 170a form a pocket 185a and shroud portions 170b form a pocket 185b. Parts 150a and 150b of liner 140 are each friction fit into pockets 185a and 185b, respectively. A series of bolts 175 and nuts 180 secure the shroud portions and liner parts together.

During use, trunnion surface 145 interacts with liner surfaces 155b and 160b. The intense pressures generated between these surfaces contributes to wear which will be absorbed by the graphitic carbon liner and not the vane trunnion. The graphitic carbon liner is sacrificial to the vane. The graphitic carbon material of liner 140 can withstand operating temperatures without oxidizing. Additionally, because the graphitic carbon material is self-lubricating, the wear against trunnion surface 145 is reduced or eliminated. Further, the self-lubricating quality of the graphitic carbon material eliminates the need for hard coat agents to be applied to the trunnion surface 145.

The graphitic carbon liner 140 can also be repositioned circumferentially or reversed axially and re-used. Liner 140 is a relatively larger component and can be easily machined or milled on appropriate machinery without compromising its function. In contrast, a bushing 105 made from graphitic carbon could not be accurately or economically machined because of its complex shape, small size and need to be split.

By using the graphitic carbon liner 140, the vane trunnion will have reduced wear. Additionally, the liner 140 has an extended operational life because each of the two liner components 150a and 150b can be reversed and re-inserted into opposite shroud portions 170b or 170a, respectively, so that surfaces 155b and 160b are facing. Thus, inner liner parts 150a and 150b can be re-inserted into the opposing shroud portions such that the previously machined surfaces 155b and 160b are still exposed. With this reversed re-insertion the sides of the facing surfaces that did not wear during the first interval will be exposed to use during the second interval operation, thus further extending the useful life of the liner. Alternatively, the previously unmachined and non-exposed surfaces 155a and 160a can be exposed and machined for use.

Liner surfaces 155b and 160b provide lubrication against trunnion surface 145, during operation. Graphitic carbon liner 140 will reduce the vane trunnion wear therefore; minimal repair of the trunnion is required after the first interval.

A shroud 165 is machined to have inner pockets 185a and 185b that receive liner 140. While shroud 165 can be made from materials such as carbon steel, a strong lightweight material such as titanium is preferred. By using a material such as titanium, for the shroud, the overall weight of the engine is greatly reduced. Further, the lower weight will reduce the degree of wear on the mutually contacting surfaces.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A split shroud system for a gas turbine engine comprising:
   a pair of annular-shaped shrouds that each contain an inner pocket to form a pair of facing pockets; and
   a pair of liners, one of said pair of liners, contained within one of said pair of pockets and the other of said pair of liners contained in the other of said pair of pockets,
   wherein each of said pair of liners has a mutually contacting surface that forms a plurality of slots.

2. The split engine shroud system of claim 1, wherein each of said pair of liners comprises a plurality of segments and each of said pair of shrouds comprises a plurality of segments, wherein each segment of each of said pair of liners forms a plurality of slots at the mutually contacting surface.

3. The split engine shroud system of claim 1, wherein each of said plurality of slots has a circular cross-section.

4. The split engine shroud system of claim 2, wherein each of said plurality of slots is dimensioned to receive an inner diameter trunnion of a turbofan vane.

5. The split engine shroud system of claim 1, wherein said each of said pair of liners is made from a graphitic carbon material.

6. The split engine shroud system of claim 1, wherein said pair of annular-shaped shrouds are made from a hardened steel material.

7. The split engine shroud system of claim 1, wherein each of said pair of annular-shaped shrouds is made from a titanium material.

8. The split engine shroud system of claim 1, wherein each of said pair of liners is press-fit into one of the pockets of the shroud.

9. The split engine shroud system of claim 2, wherein each of said plurality of liner parts can be removed and re-inserted into the other of said pair of pockets.

10. The split engine shroud system of claim 1, wherein each of said liners is annular-shaped.

11. A split shroud system for a gas turbine engine comprising:
- a pair of annular-shaped shrouds; each of said pair of shrouds having an inner pocket to form a pair of inner pockets; and
- each of said pair of pockets having liner parts that form a circle; said liner parts of one of said pair of pockets facing liner parts the other of said pair of pockets to form liner pairs, one of each of said of pair of liner parts has a mutual abutting surface that forms a plurality of slots to receive vane trunnions,
- wherein said liner parts and said plurality of slots accept wear caused by said trunnions during operational flight conditions of the engine.

12. The split engine shroud system of claim 11, wherein each of said plurality of slots has a circular cross-section.

13. The split engine shroud system of claim 11, wherein each of said plurality of slots is dimensioned to receive an inner diameter trunnion of a turbofan vane.

14. The split engine shroud system of claim 11, wherein said each of said pair of liners is made from a graphic carbon material.

15. The split engine shroud system of claim 11, wherein said pair of annular-shaped shrouds are made from a hardened steel material.

16. The split engine shroud system of claim 11, wherein said pair of annular-shaped shrouds are made from a titanium material.

17. The split engine shroud system of claim 11, wherein each of said pair of liner parts is press-fit into one of the pockets of the shroud.

18. The split engine shroud system of claim 11, wherein each of said plurality of liner parts can be removed and re-inserted into the other of said pair of pockets.

19. The split engine shroud system of claim 11, wherein each of said inner pockets is annular-shaped.

* * * * *